US008665276B2

(12) United States Patent
Chiang et al.

(10) Patent No.: US 8,665,276 B2
(45) Date of Patent: Mar. 4, 2014

(54) IMAGE PROCESSING METHOD FOR FEATURE RETENTION AND THE SYSTEM OF THE SAME

(75) Inventors: Ann-Shyn Chiang, Hsin Chu (TW);
Hsiu-Ming Chang, Hsin Chu (TW);
Yung-Chang Chen, Hsin Chu (TW);
Kuan-Yu Chen, Taipei (TW)

(73) Assignee: National Tsing Hua University, Hsin Chu (TW)

( * ) Notice: Subject to any disclaimer, the term of this patent is extended or adjusted under 35 U.S.C. 154(b) by 495 days.

(21) Appl. No.: 12/814,835

(22) Filed: Jun. 14, 2010

(65) Prior Publication Data

US 2011/0199370 A1  Aug. 18, 2011

(30) Foreign Application Priority Data

Feb. 12, 2010  (TW) ............................... 99104760 A

(51) Int. Cl.
*G06T 11/20* (2006.01)
*G06T 11/40* (2006.01)

(52) U.S. Cl.
CPC ............ *G06T 11/203* (2013.01); *G06T 11/206* (2013.01); *G06T 11/40* (2013.01)
USPC ..... 345/442; 345/440; 345/440.1; 345/440.2; 345/441; 345/443; 345/418; 345/419; 345/420; 345/421; 345/422; 345/423; 345/424; 345/426; 345/427

(58) Field of Classification Search
CPC ...... G06T 11/203; G06T 11/206; G06T 11/40
USPC .................................. 345/419–420, 440–443
See application file for complete search history.

(56) References Cited

U.S. PATENT DOCUMENTS

| 5,038,302 | A | * | 8/1991 | Kaufman | 345/424 |
| 5,796,400 | A | * | 8/1998 | Atkinson et al. | 345/420 |
| 6,262,738 | B1 | * | 7/2001 | Gibson et al. | 345/419 |
| 7,646,383 | B1 | * | 1/2010 | Taylor | 345/420 |
| 2003/0034971 | A1 | * | 2/2003 | Fujiwara et al. | 345/420 |
| 2003/0184544 | A1 | * | 10/2003 | Prudent | 345/419 |
| 2003/0194057 | A1 | * | 10/2003 | Dewaele | 378/210 |
| 2004/0024575 | A1 | * | 2/2004 | Surazhsky et al. | 703/2 |

(Continued)

OTHER PUBLICATIONS

Chih-Lun Lin et al., Bezier-Tube Based Featrue Extraction and Surface Warping for Surface Models, National Tsing Hua University, Taiwan, Aug. 24, 2009.

*Primary Examiner* — Jin-Cheng Wang
(74) *Attorney, Agent, or Firm* — Muncy, Geissler, Olds & Lowe, PLLC

(57) ABSTRACT

The present invention discloses an image processing method for feature retention associated with averaging processes. The image processing method comprises: scaling and aligning a plurality of image data for acquiring feature information; determining a plurality of two-dimensional feature label points according to the feature information for generating at least one Bezier curve; utilizing the at least one Bezier curve to generate at least one Bezier tube and performing Bezier tube fitting for generating result of Bezier tube fitting; deforming the plurality of image data according to the Bezier tube or the result of Bezier tube fitting for generating a plurality of deformed image data; and averaging the plurality of deformed image data for generating feature-preserved average image data. The present invention also provides an image processing system, a computer readable storage medium, and a computer program product, for implementing the image processing method.

15 Claims, 20 Drawing Sheets
(12 of 20 Drawing Sheet(s) Filed in Color)

(56) References Cited

U.S. PATENT DOCUMENTS

| | | | |
|---|---|---|---|
| 2004/0068187 A1* | 4/2004 | Krause et al. | 600/443 |
| 2004/0083611 A1* | 5/2004 | Rubbert et al. | 29/896.11 |
| 2004/0249809 A1* | 12/2004 | Ramani et al. | 707/4 |
| 2005/0240383 A1* | 10/2005 | Hashima et al. | 703/7 |
| 2006/0147872 A1* | 7/2006 | Andreiko | 433/24 |
| 2006/0262112 A1* | 11/2006 | Shimada | 345/419 |
| 2007/0115289 A1* | 5/2007 | Goldfarb | 345/473 |
| 2008/0275677 A1* | 11/2008 | Landon | 703/2 |
| 2009/0179899 A1* | 7/2009 | Gregory et al. | 345/473 |
| 2009/0248184 A1* | 10/2009 | Steingart et al. | 700/98 |
| 2009/0290769 A1* | 11/2009 | Matsumoto | 382/128 |
| 2010/0318327 A1* | 12/2010 | Holden et al. | 703/1 |

* cited by examiner

IMAGE PROCESSING METHOD FOR FEATURE RETENTION AND THE SYSTEM OF THE SAME

FIELD OF THE INVENTION

The present invention is generally related to an image processing method and, more particularly, to an image processing method for feature retention associated with averaging a plurality of image data. The feature may be a surface feature of the images.

DESCRIPTION OF THE PRIOR ART

In the past decades, quite an endeavor has been devoted from academia and industries to find out the structures and functions of the neural network in the human brain. However, this is a difficult task due to its enormous number of neurons and complexities. To simplify this problem, in basic researches of life science, *Drosophila* (fruit flies), with the capabilities of learning and memory, has been chosen as a model to facilitate the understanding of structures and functions of the brain because the size and number of cells in a *Drosophila* brain are much smaller than in the human one. Moreover, it's relatively easy to get large number of samples out of fruit flies.

By using the confocal microscopy technology, individual *Drosophila* brains may be scanned to get 2D brain image slices at designated depth. Moreover, by visualizing theses 2D brain image slices, a 3D brain model image can be constructed.

There are variations among the brain images acquired from the different individual *Drosophila*. Therefore, for generating a 3D *Drosophila* brain atlas, or *Drosophila* standard brain, it is necessary to carry out an averaging procedure among those 3D brain images collected. However, in the ordinary averaging procedure, the concave-shaped structures may disappear during the process and result in a so-called close-up error. This may cause a serious deviation of the averaged model from the actual concave-shaped structures in individual brain images. Specifically, the errors are more critical in dealing with the surface structures, such as brains, which have complicated sulci.

To overcome the shortcoming existed in the prior art, the present invention provides an image processing method for feature retention associated with averaging processes and the system of the same, which is described in the following description.

SUMMARY OF THE INVENTION

For overcoming the shortcoming existed in the prior art, in one aspect of the present invention, an image processing method for feature retention associated with averaging a plurality of image data is provided. The image processing method comprises: scaling and aligning a plurality of image data for acquiring feature information; determining a plurality of two-dimensional feature label points according to the feature information for generating at least one Bezier curve; utilizing the at least one Bezier curve to generate at least one Bezier tube and performing Bezier tube fitting for generating result of Bezier tube fitting; deforming, by a processor, the plurality of image data according to the Bezier tube or the result of Bezier tube fitting for generating a plurality of deformed image data; and averaging the plurality of deformed image data for generating feature-retained averaged image data.

In another aspect of the present invention, an image processing system for feature retention associated with averaging a plurality of image data is provided. The image processing system comprises: a control module; a scaling and aligning module coupled to the control module, for scaling and aligning a plurality of image data for acquiring feature information; a Bezier curve fitting module coupled to the control module, for determining a plurality of two-dimensional feature label points according to the feature information for generating at least one Bezier curve; a Bezier tube fitting module coupled to the control module, for utilizing the at least one Bezier curve to generate at least one Bezier tube and performing Bezier tube fitting for generating result of Bezier tube fitting; a deforming module coupled to the control module, for deforming the plurality of image data according to the Bezier tube or the result of Bezier tube fitting for generating a plurality of deformed image data; an averaging module coupled to the control module, for averaging the plurality of deformed image data for generating feature-retained averaged image data; and a database module coupled to the control module, for storing data and/or information generated by each of the modules.

Furthermore, in another aspect of the present invention, a computer readable storage medium is provided. The storage medium stores a program of instructions executable by a computer to perform an image processing method for feature retention associated with averaging a plurality of image data.

In still another aspect of the present invention, a computer program product is provided. The computer program product comprises instructions executable by a computer to perform an image processing method for feature retention associated with averaging a plurality of image data.

By referring the following description and illustration of the embodiments of the present invention and the accompanying figures, the advantages and the spirit of the present invention can be better understood.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENT

Figure 1:
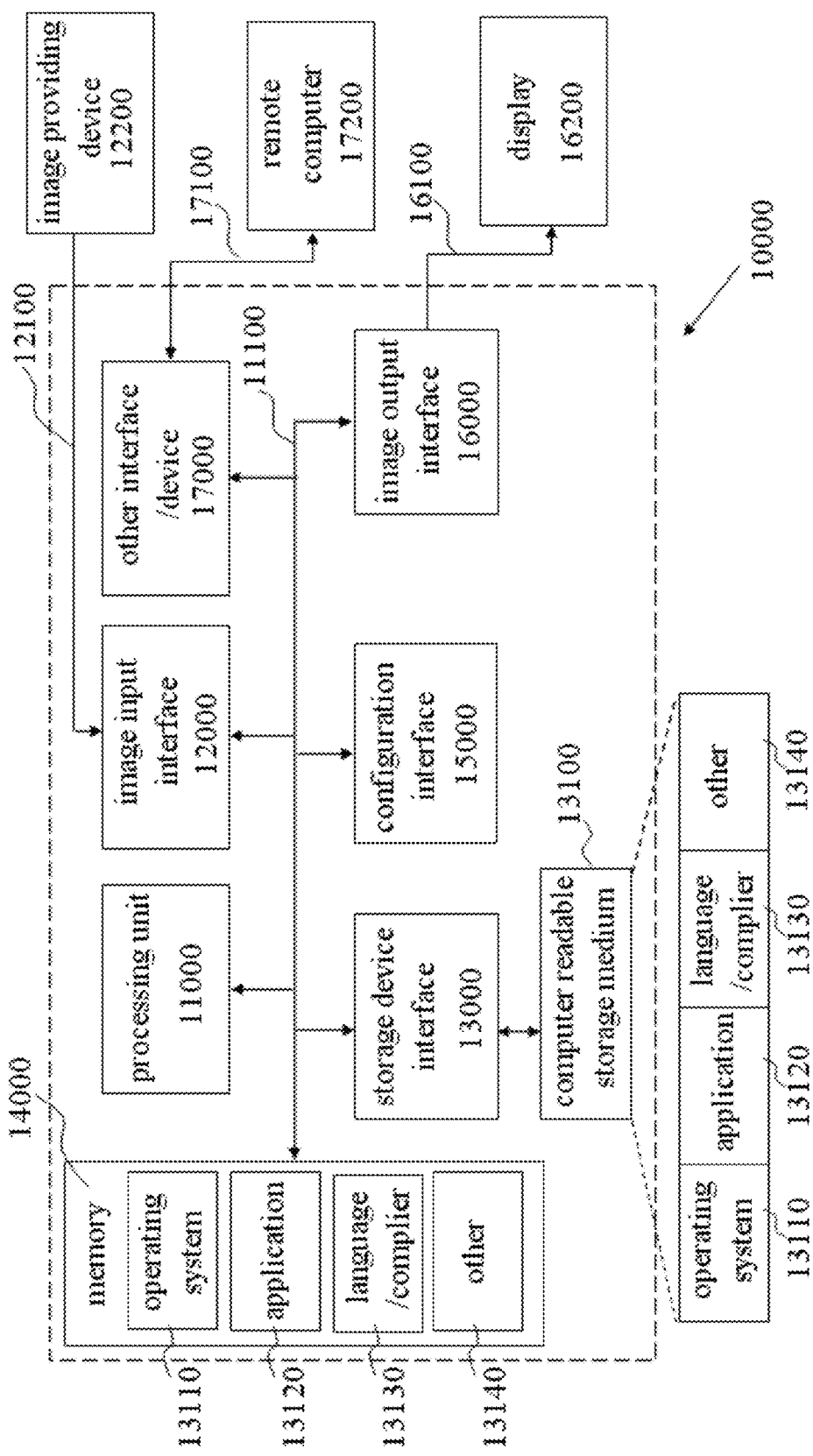
FIG. 1 illustrates an exemplary hardware for implementing the embodiments of the present invention.
Figure 2:
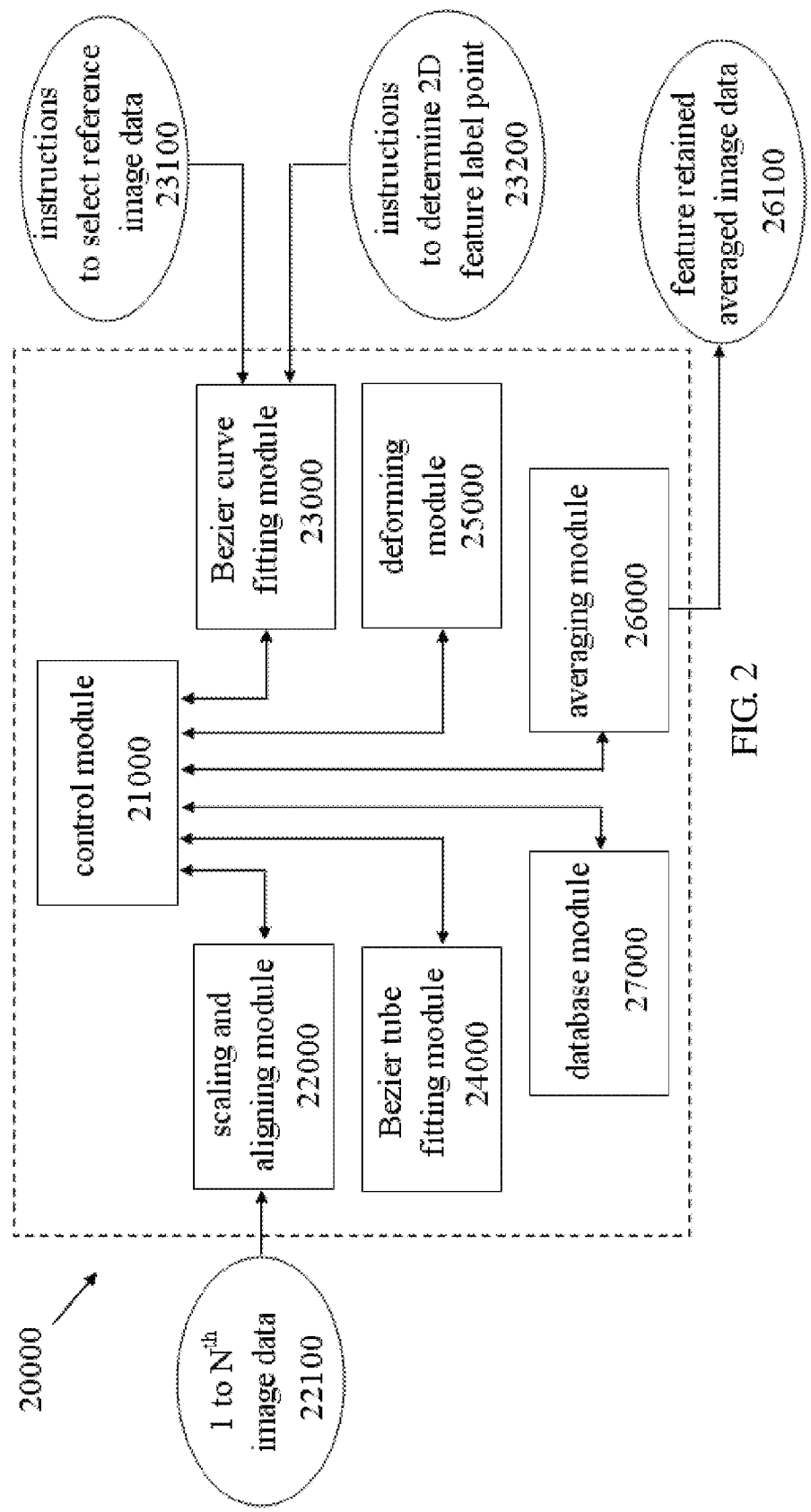
FIG. 2 illustrates an image processing system according to the embodiments of the present invention.

An image processing method 30000 is provided in the embodiments of the present invention, as shown in FIGS. 3A-3D. For implementing the image processing method 30000, an image processing system 20000 is provided in the embodiments of the present invention, as shown in FIG. 2. For implementing the image processing system 20000, an exemplary hardware is provided in the embodiments of the present invention, such as a computer 10000, as shown in FIG. 1. The detailed description is provided as follows.

FIG. 1 shows an exemplary hardware according to the embodiments of the present invention. In this embodiment, the hardware may be a computer 10000 which comprises: a processing unit 11000; an image input interface 12000 coupled to the processing unit 11000; a storage device interface 13000 coupled to the processing unit 11000; a memory 14000 coupled to the processing unit 11000; a configuration interface 15000 coupled to the processing unit 11000; an image output interface 16000 coupled to the processing unit 11000; an other interface or device 17000 coupled to the processing unit 11000. The above-mentioned components may be coupled via a bus 11100 or other forms. The storage device interface 13000 may couple to a computer readable storage medium 13100 which stores a computer program product. The instructions of the computer program product may be executed by a computer to perform the image processing system 20000 and thus the image processing method 30000. Moreover, the computer readable storage medium 13100 and the memory 14000 may store software, such as, operating system, 13110, applications 13120, programming language and corresponding compiler 13130 and/or other program 13140. The processing unit 11000 may be implemented by various processors and, more particularly, by a programmable processor for some specific purpose.

The image data may be received by the image input interface 12000, from an image providing device 12200 via an image input channel 12100. In preferred embodiments, 1 to $N^{th}$ (N is a natural number being larger or equal to 2) image data of the surface model of *Drosophila* brains are received and then stored in the computer readable storage medium 13100 and/or memory 14000, for facilitating the processing by the image processing system 20000. Moreover, the parameters required within the image processing system 20000 may be configured by a user via the configuration interface 15000 or by a predetermined program. The image data within different stage of the image processing method 30000 may be displayed on a display 16200 by an image output interface 16000 via an image output channel 16100. The image providing device 12200 may comprise a confocal microscopy device, for scanning the individual *Drosophila* brains and acquiring their brain surface model data. The related imaging technique may refer to U.S. patent application Ser. No. 11/169,890 "Bio-Expression System and the Method of the Same". Further, other interface or device 17000 may widely refer to other needed interfaces and/or devices which are not illustrated. In the preferred embodiments, the other interface or device 17000 may comprise network ports and wired or wireless network devices, for coupling to at least one remote computer 17200 via wired or wireless network channel 17100. Hence, the qualified remote computer 17200 may command the computer 10000 (more specifically, the database module 27000) to send the image data to the remote computer 17200 for further utilization. The remote computer 17200, used herein, is widely referring to any device being able to receive and use the above-mentioned image data.

FIG. 2 shows the image processing system 20000 according to the embodiments of the present invention. In FIG. 2, the image processing system 20000 comprises: a control module 21000; a scaling and aligning module 22000 coupled to the control module 21000, for scaling and aligning the 1 to $N^{th}$ image data of the surface model of the *Drosophila* brain received by the image input interface 12000, for reducing the main variation between the image data and thus facilitating capturing feature information; a Bezier curve fitting module 23000 coupled to the control module 21000, for performing Bezier curve fitting procedure; a Bezier tube fitting module 24000 coupled to the control module 21000, for performing Bezier tube fitting procedure according to the Bezier curve (more specific, a result of Bezier tube fitting may be positioned to the N sets of data, or the Bezier curve configured by the user may be positioned to the N sets of data for performing Bezier tube fitting, wherein the Bezier tube fitting module 24000 may receive the Bezier curve, form the Bezier tube, and perform the fitting); a deforming module 25000 coupled to the control module 21000, for deforming the plurality of image data (surface model) according to the Bezier tube or the result of Bezier tube fitting for generating a plurality of deformed image data; an average module 26000 coupled to the control module 21000, for averaging the plurality of deformed image data for generating feature-retained averaged image data 26100; and a database module 27000 coupled to the control module 21000, for storing (temporarily or permanently) the data and/or information generated by each of the above-mentioned modules. The detailed processing procedures are described in the following paragraph.

Figure 3A:
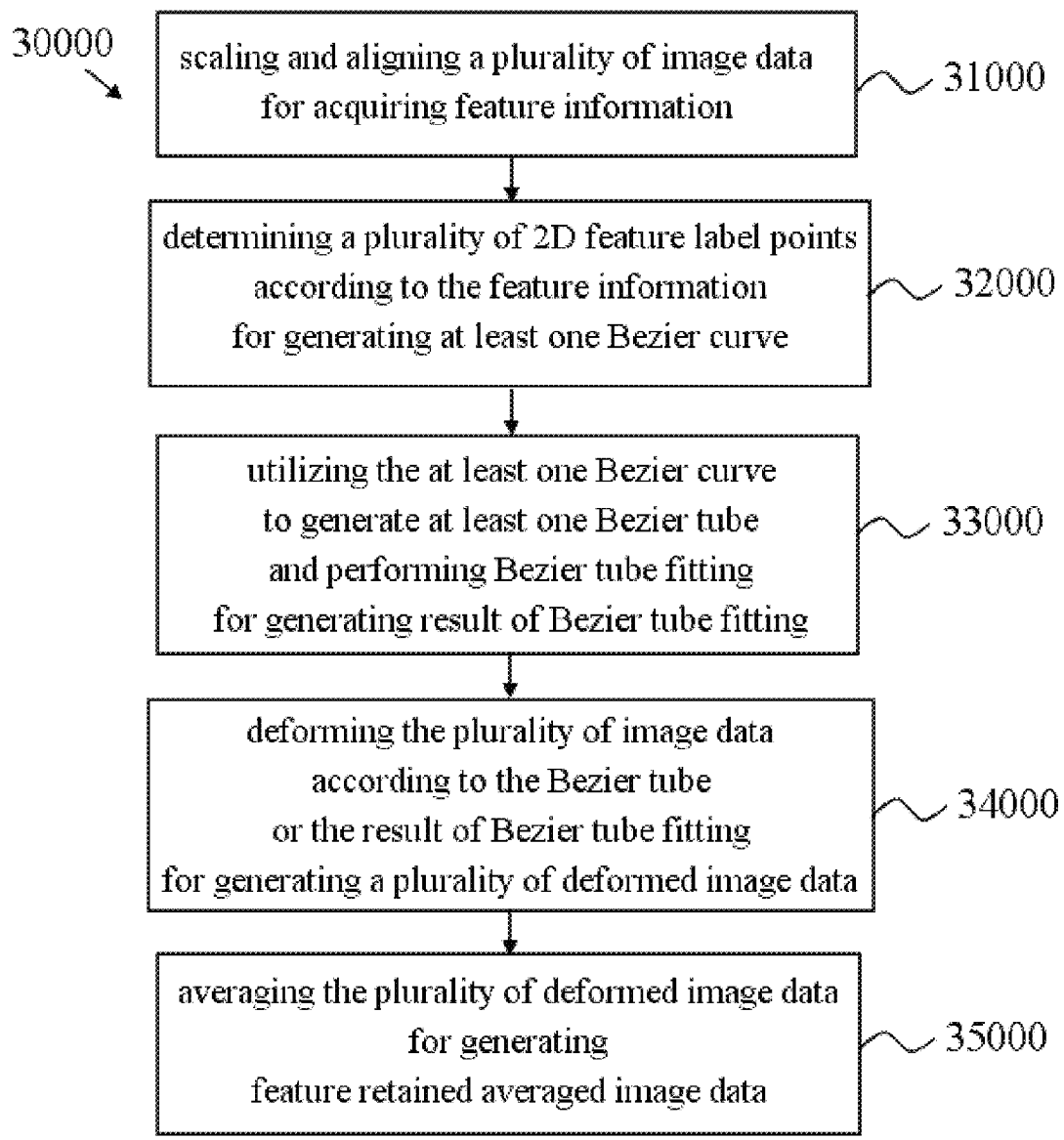
FIGS. 3A-3D illustrate procedures of an image processing method according to the embodiments of the present invention.

FIGS. 3A-3D show the procedures of the image processing method 30000 according to the embodiments of the present invention. In FIG. 3A, the image processing method 30000 comprises: in step 31000, scaling and aligning a plurality of image data (image data 1 to $N^{th}$) for acquiring feature information; in step 32000, determining a plurality of 2D feature label points according to the feature information for generating at least one Bezier curve; in step 33000, utilizing the at least one Bezier curve to generate at least one Bezier tube and performing Bezier tube fitting for generating result of Bezier tube fitting; in step 34000, deforming the plurality of image data according to the Bezier tube or the result of Bezier tube fitting for generating a plurality of deformed image data; and in step 35000, averaging the plurality of deformed image data for generating feature-retained averaged image data. In preferred embodiments, the step 34000 is executed by a processor. For brevity, the image processing method 30000 may be viewed as follows: the step 31000 to 33000 may substantially be viewed as selecting and establishing a reference of feature information from a plurality of image data; the step 34000 may be substantially viewed as computing the relationships between each of the image data and their Bezier tubes, deforming their Bezier tube, so as to deform (change the shape of) the model in the image data, and the step 35000 may average all the deformed model of the image data for acquiring feature-retained averaged data.

Figure 3B:
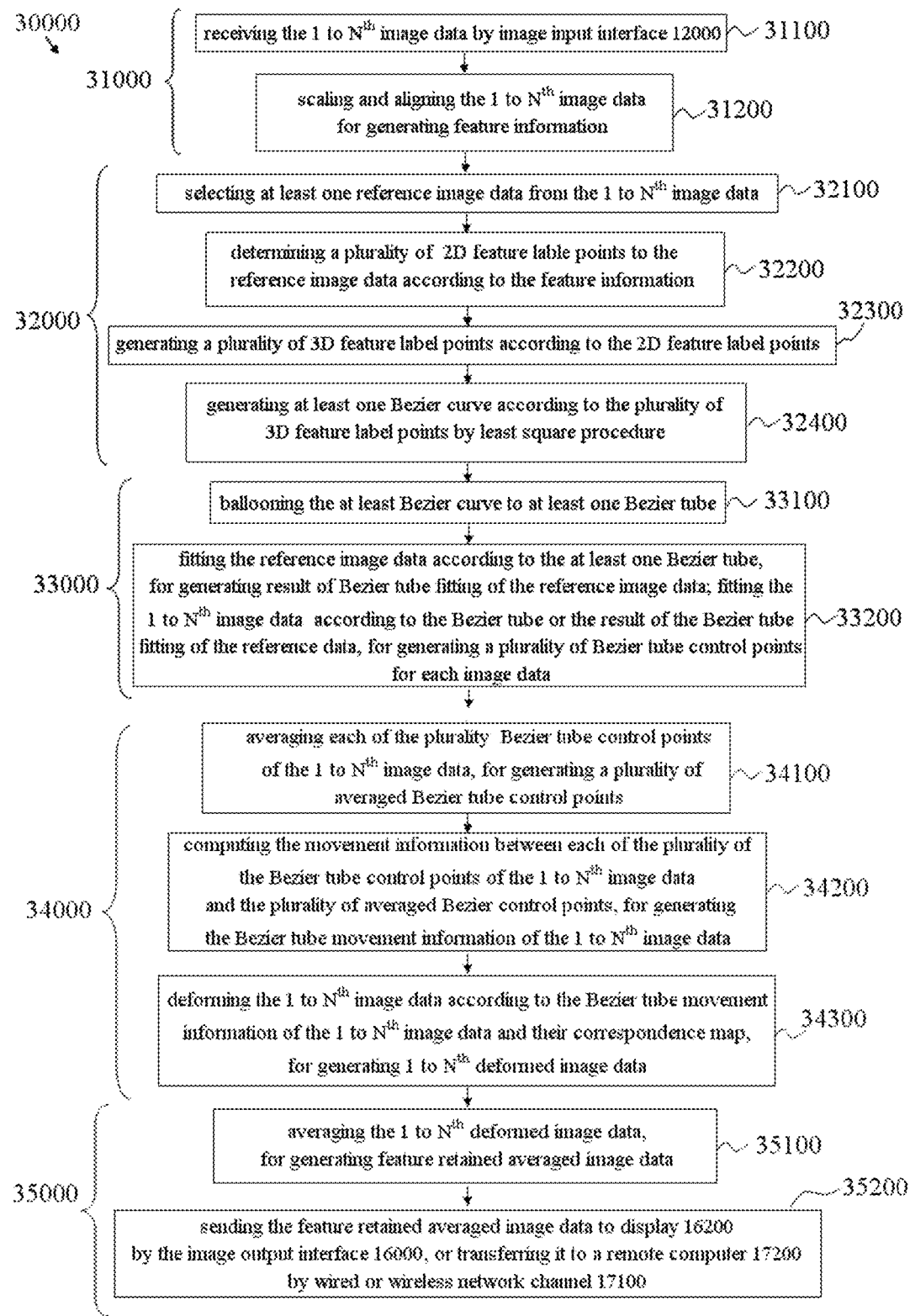

FIG. 3B illustrates the more detailed procedures of the image processing method 30000. In FIG. 3B, the image processing method 30000 comprises: in step 31100, executing the application 13120 stored in the computer readable storage medium 13100 by the processing unit 11000, for receiving and storing the 1 to $N^{th}$ image data from the image input interface 12000 to the database module 27000 by the control of the control module 21000; in step 31200, capturing, scaling, and aligning the 1 to $N^{th}$ image data from the database module 27000 by utilizing the scaling and aligning module 22000, for reducing (or eliminating) the main (substantial) variations between the image data, whereby feature information may be determined; the scaled and aligned image data may be stored in the database module 27000; the image data and the feature information may be displayed on a display 16200 by utilizing the image output interface 16000 via the image output channel 16100; the feature information may be, such as, concave-shaped structure, which represents the common concave-shaped structure on almost all *Drosophila* brain image data; in step 32100, the user may input instruction 23100 to select the image data, by utilizing the configuration interface 15000, which is sent to the Bezier curve fitting module 23000, for selecting at least one of the 1 to $N^{th}$ image data as a reference image data (otherwise, the image data may be select by a computer program); in step 32200, the user (utilizing the configuration interface 15000) or the computer program may input instructions 23200 for configuring a plurality of 2D feature label points to the reference image data according to the feature information, for generating a plurality of 2D feature label points; in step 32300, generating a plurality of 3D feature label points according to the plurality of 2D feature label points by utilizing the Bezier curve fitting module 23000; in step 32400, generating at least one Bezier curve according to the plurality of 3D feature label points by implementing least square procedure; in step 33100, transferring (ballooning) the at least one Bezier curve to at least one Bezier tube, by utilizing the Bezier tube fitting module 24000; in step 33200, fitting, by utilizing the Bezier tube fitting module 24000, the reference image data according to the at least one Bezier tube, for generating result of Bezier tube fitting of the reference image data; fitting the 1 to $N^{th}$ image data according to the Bezier tube or the result of the Bezier tube fitting of the reference image data, for generating a plurality of Bezier tube control points for each image data; in step 34100, averaging, by utilizing the deforming module 25000, the plurality of Bezier tube control points of the 1 to $N^{th}$ image data, for generating a plurality of averaged Bezier tube control points; in step 34200, computing, by utilizing the deforming module 25000, the transformation of each of the plurality of Bezier tube control points of the 1 to $N^{th}$ image data relative to the plurality of averaged Bezier tube control points, for generating the transformation information of each of the 1 to $N^{th}$ image data; in step 34300, deforming, by utilizing the deforming module 25000, the 1 to $N^{th}$ image data according to the transformation information for each of the 1 to $N^{th}$ image data and correspondence map of each of the 1 to $N^{th}$ image data, wherein the correspondence map of each of the 1 to $N^{th}$ image data is generated by fitting the Bezier tube control points of the $k^{th}$ image data and the $k^{th}$ image data being scaled and aligned; in step 35100, averaging, by utilizing the averaging module 26000, the 1 to $N^{th}$ deformed image data, for generating feature-retained averaged image data 26100; and in step 35200, transmitting, by utilizing the image output interface 16000, the feature-retained averaged image data to the display 16200 or transmitting, via wired or wireless network channel 17100, the feature-retained averaged image data to a remote computer 17200.

Figure 10:
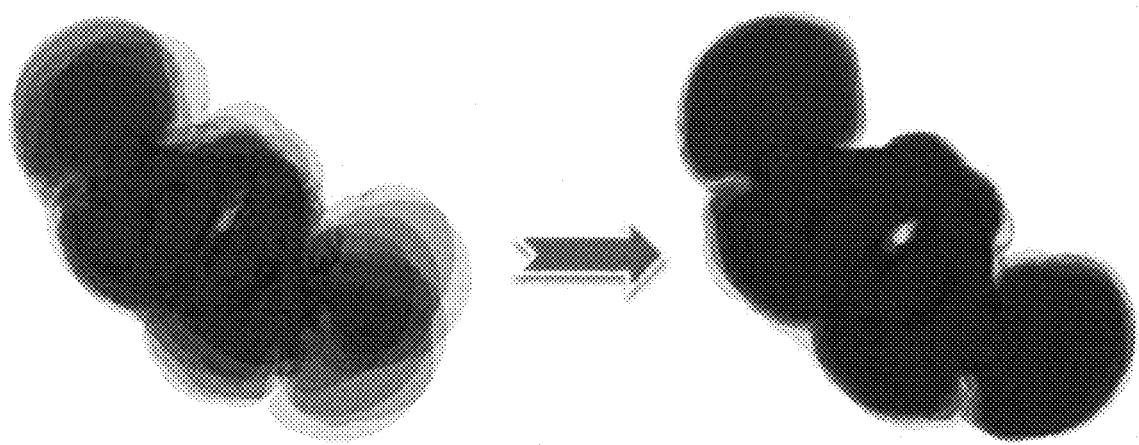
FIG. 10 illustrates the result of the rigid transformation according to the embodiments of the present invention.

In some embodiments of the present invention, in step 31200, the rigid transformation procedure may be applied. The rigid transformation procedure may be defined as:

$$x'=R(x-C)+C+T$$

Where the position of an arbitrary point before rigid transformation is $x=[x, y, z]^T$, and x' is the new position. $C=[C_x, C_y, C_z]^T$ is the center of rotation. $T=[T_x, T_y, T_z]^T$ is the translation matrix. R is the rotation matrix. Moreover, a good criterion to determine how two image data (surface) are alike (whether they have been appropriately scaled and aligned or not) is to measure the distance between them. In one embodiment, after several iterations, the result of rigid transformation is shown in FIG. 10.

Figure 3C:
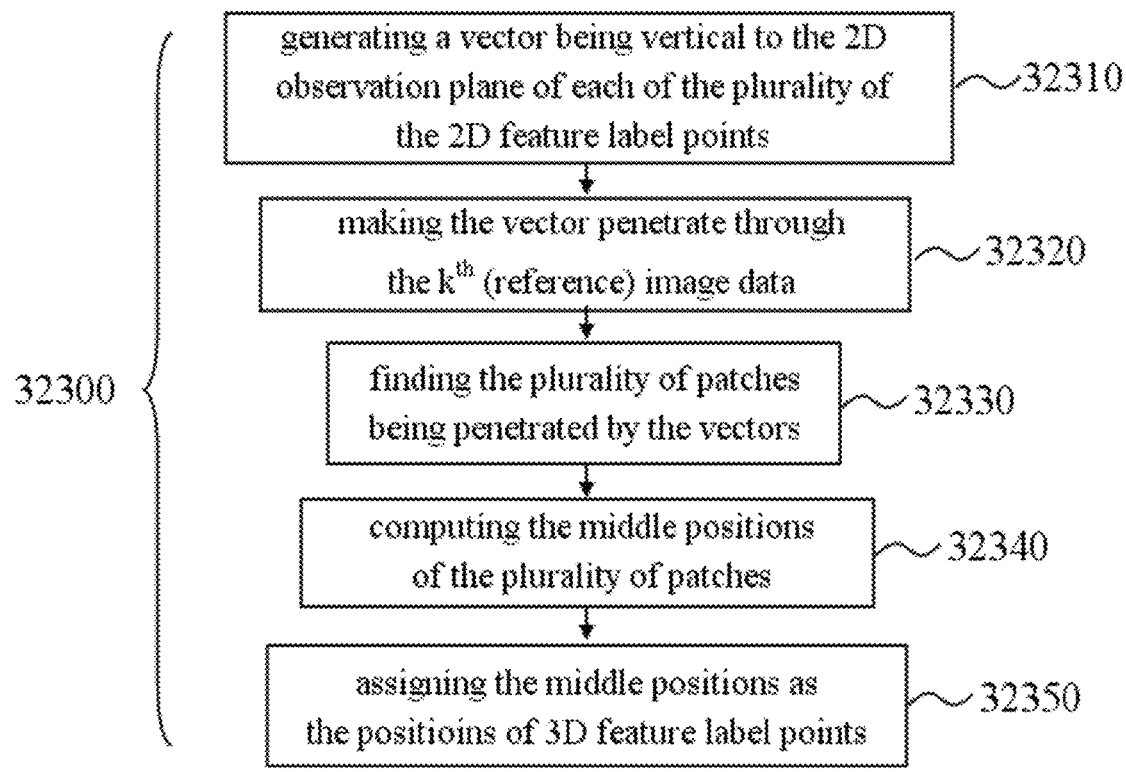

In the preferred embodiments, a graphical user interface (GUI) program is designed to let users label specific features of a 3D model (more specifically, surface model) with a 2D operation system. And the label selection procedure may also find out the depth information of each label feature point. In FIG. 3C, the step 32300 comprises: in step 32310, by utilizing the Bezier curve fitting module 23000, a vector (trajectory vector) being vertical to the 2D observation plane is generated according to each of 2D feature label points; in step 32320, sending, by utilizing the Bezier curve fitting module 23000, the vectors to penetrate through the surface model of the $k^{th}$ image data; in step 32330, finding, by utilizing the Bezier curve fitting module 23000, a plurality of patch being penetrated by the vectors of each of 2D feature label points of the $k^{th}$ image data, wherein the $k^{th}$ image data is substantially referring to the selected reference image data (it is also suitable for other image data); in step 32340, computing, by utilizing the Bezier curve fitting module 23000, the middle values (positions) of the plurality of the patches (or patch groups); and in step 32350, assigning the middle values (positions) as the positions of the 3D feature label points. It should be noted that since most of the surface models are closed, the vector may pass through the surface model at least twice (penetrate into the surface model first and then penetrate out of it). By calculating the middle point between these two penetrated patches and assigning the position of the middle point as the position of the 3D feature label point, the 3D feature label points are ensured to be inside the 3D surface models in most of the conditions.

Figure 3D:
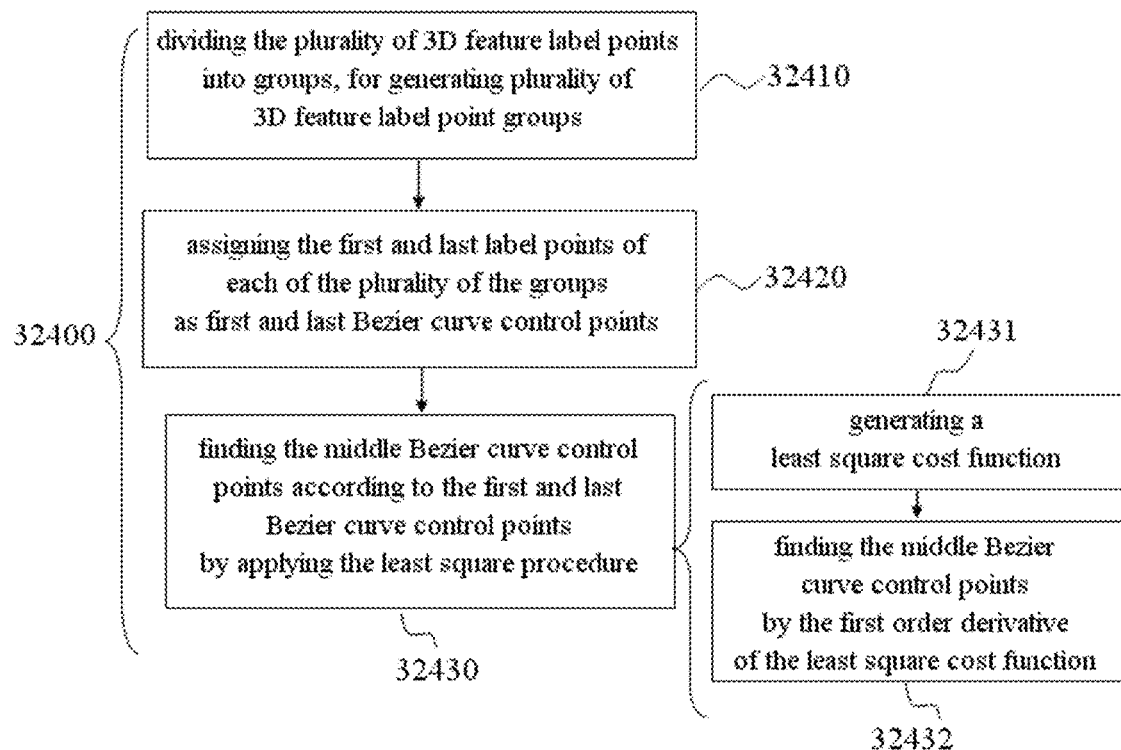

In preferred embodiment, as shown in FIG. 3D, the step 32400 comprises: in step 32410, dividing, by utilizing the Bezier curve fitting module 23000, the plurality of 3D feature label points into groups (utilizing several 3D feature label points as a group to find out a curve), for generating a plurality of 3D feature label point groups; in step 32420, assigning, by utilizing the Bezier curve fitting module 23000, the first and last label points of each of the plurality of 3D feature label point groups as each of the first and last Bezier curve control points; and in step 32430, finding, by utilizing Bezier curve fitting module 23000, the middle Bezier curve control points between the first and last Bezier curve control points by applying the least square procedure. In preferred embodiments, the step 32430 comprises: in step 32431, generating, by utilizing the Bezier curve fitting module 23000, a least square cost function; and in step 32432, finding, by utilizing the Bezier curve fitting module 23000, the middle Bezier curve control points by applying the first order derivative procedure to the least square cost function. The $m^{th}$ order Bezier curve may be expressed as:

$$C(t_i) = \sum_{k=0}^{m} \binom{m}{k}(1-t_i)^{m-k} t_i^k P_k, \; 0 \le t_i \le 1$$

Where $C(t_i)$ is an interpolated point at parameter value $t_i$ (any point of the m-order Bezier curve, or refer as "curve point"), m is degree of Bezier curve, and $P_k$ is the $k^{th}$ control point. To generate n point (n is count of interpolating points) between the first and last Bezier curve control points inclusive, the parameter $t_i$ is uniformly divided into n−1 intervals between 0 and 1 inclusive. The representation of a cubic Bezier curve is as follows:

$$C(t_i) = (1-t_i)^3 P_0 + 3t_i(1-t_i)^2 P_1 + 3t_i^2(1-t_i)P_2 + t_i^3 P_3$$

The Bezier curve will pass through its first and last control points. And the middle Bezier curve control points, i.e., $P_1$ and $P_2$, should be determined Instead of using time-consuming iterative optimization process to locate $P_1$ and $P_2$, a least square procedure based on the first-order partial derivative procedure is applied. The least square procedure gives the better locations of the middle control points that minimize the square distance between original input feature label points and the fitted points and is well suited for approximating data. Suppose that there are n 3D feature label points to be fitted, $p_i$ and $C(t_i)$ are values of the original 3D feature label points and the approximated Bezier curve points respectively. The least square cost function may be expressed as follows:

$$F = \sum_{i=1}^{n} [C(t_i) - p_i]^2, \text{ or}$$

$$F = \sum_{i=1}^{n} [(1-t_i)^3 P_0 + 3t_i(1-t_i)^2 P_1 + 3t_i^2(1-t_i)P_2 + t_i^3 P_3 - p_i]^2$$

By applying the first-order partial derivatives to the cost function, the middle Bezier curve control points may be obtained. The $P_1$ and $P_2$ can be determined by:

$$\frac{\partial F}{\partial P_1} = 0, \text{ and } \frac{\partial F}{\partial P_2} = 0$$

Figure 5A:
FIGS. 5A and 5B illustrate three-dimensional feature label points and corresponding Bezier curves according to the embodiments of the present invention.
Figure 5B:
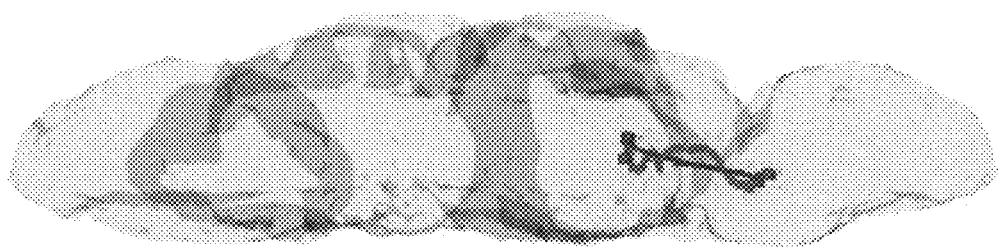
Figure 6A:
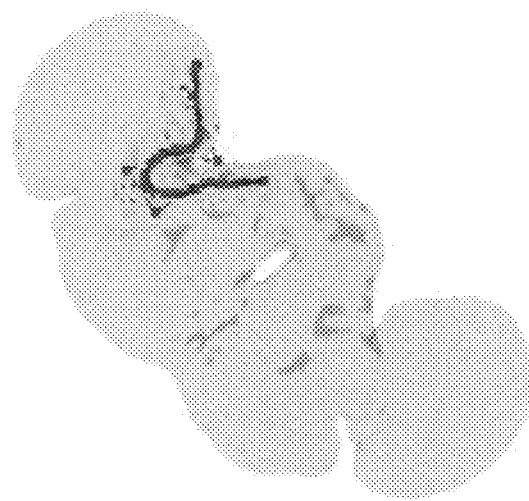
FIGS. 6A and 6B illustrate several Bezier curve segments according to the embodiments of the present invention.
Figure 6B:

After determining the Bezier curve control points, the cubic Bezier curves may fit large number of original 3D feature label points shown in FIGS. 5A and 5B. FIGS. 5A and 5B illustrate the 3D feature label points and corresponding Bezier curves according to the embodiments of the present invention. In preferred embodiments, to get more accurate fitting result, the original digitized curve (labeled points) may be cut into multiple curve segments, and then the least square fitting procedure may be applied to each of the curve segments. The fitting results are shown in FIGS. 6A and 6B. FIGS. 6A and 6B illustrate several Bezier curve segments according to the embodiments of the present invention. It is shown that by applying several Bezier curve segments, the Bezier curve is more accurately fitted to the corresponding 3D feature label points.

Figure 7:
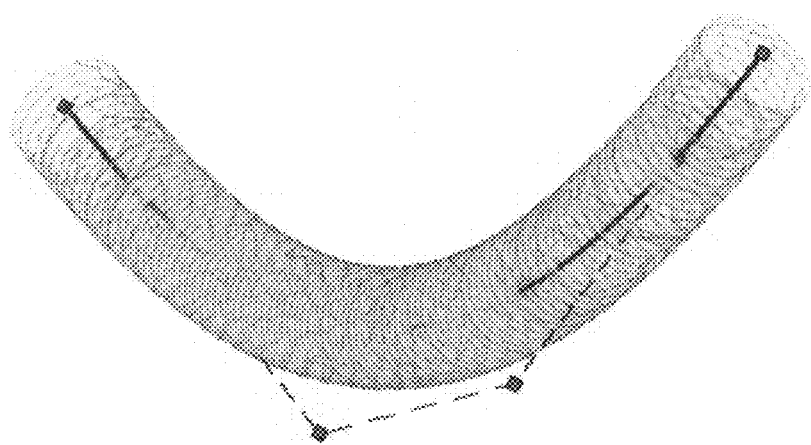
FIG. 7 illustrates a three-dimensional Bezier tube according to the embodiments of the present invention.
Figure 8:
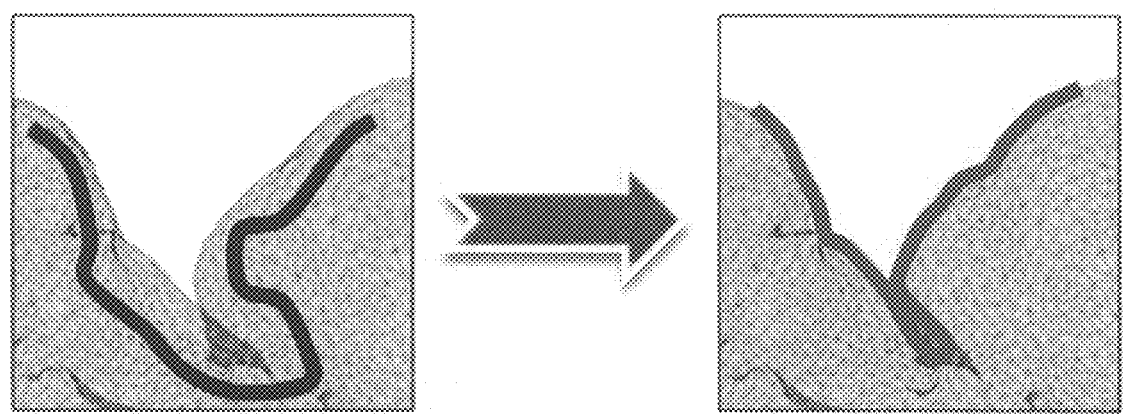
FIG. 8 illustrates the variation for capturing the feature according to the embodiments of the present invention.

In the preferred embodiments, in the step 33100, each circle with diameter R centered at $C(t_i)$ on each curve is inserted, and the circle is orthogonal to the tangent of the corresponding curve point. FIG. 7 shows the result after ballooning procedure in step 33100. The curve after ballooning procedure is referred as "cubic Bezier tube". The center line of the tube is a cubic Bezier curve interpolated by its four Bezier curve control points. The notation, CyPt(i,j), refers as the $j^{th}$ cylinder balloon points on the $i^{th}$ circle. In the preferred embodiments, at least one Bezier tube is fitted to the reference image data, for generating result of the Bezier tube fitting. In preferred embodiments, the step 33200 comprises moving and relocating the at least one Bezier curve in space, for more accurately defined the feature of the image data, as shown in FIG. 8. FIG. 8 illustrates the variation for capturing the feature according to the embodiments of the present invention, such as the result from the step 33200. In the step 33200, a 3D distance map is applied. The 3D distance map is a volumetric dataset that represents the closest distance information. Given a geometric object (surface model image data) in 3D space, the 3D distance map defines the shortest distance d(x) from a point $x \in R^3$ to the object. Or equivalently:

$$DistMap(x) = \min_{\forall k}\{d(x) \mid d(x) = \|x - p_k\|\}$$

The above procedure is distance-based. Therefore, it is necessary to find the relationship of the average distance (ie., the system cost) between the multi-segment cubic Bezier tube and the surface model of the image data, for minimizing the system cost iteratively. The average distance for the $k^{th}$ tube segment, $E_k$, is defined as follows:

$$E_k = \frac{1}{NM}\sum_{i=1}^{N}\sum_{j=1}^{M} d^2(CyPt_k(i,j))$$

Where d(x) is the recorded value of DistMap(x).

Figure 9:
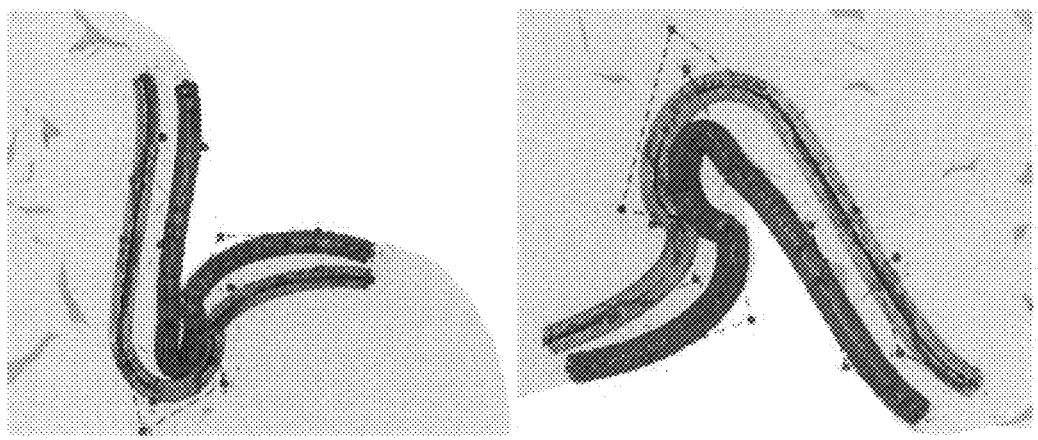
FIG. 9 illustrates the result of Bezier tube fitting according to the embodiments of the present invention.

By using gradient descent procedure, the cost function $E_k$ may be minimized After several iterations, the position of the Bezier tube may be optimized, as shown in FIG. 9, and the plurality of optimized Bezier tube control points may be obtained. In other words, the 33200 may be treated as fitting the 1 to $N^{th}$ image data according to the Bezier tube or the result of the Bezier tube fitting of the reference image data. The Bezier tube or the result of the Bezier tube fitting of the reference image data may be positioned to the 1 to $N^{th}$ image data to be assigned as the initial position of their Bezier tube. Then, the result of Bezier tube fitting of the 1 to $N^{th}$ image data is obtained by applying the Bezier tube fitting procedure.

In the preferred embodiments, in step 34100, the averaging procedure may only be applied to the plurality of the Bezier tube control points, but not to all the discrete curve points. The averaged Bezier tube control points may be expressed as follows:

$$P_{avg} = \frac{\sum_{j=1}^{m}\begin{bmatrix}P_{0j}\\P_{1j}\\P_{2j}\\P_{3j}\end{bmatrix}}{m} = \frac{\sum_{j=1}^{m}\begin{bmatrix}x_{0j} & y_{0j} & z_{0j}\\x_{1j} & y_{1j} & z_{1j}\\x_{2j} & y_{2j} & z_{2j}\\x_{3j} & y_{3j} & z_{3j}\end{bmatrix}}{m}$$

Where m refers to the number of the cubic Bezier curve. Once the averaged Bezier tube control points are determined, the center line of the averaged Bezier tube may be constructed by applying the following equation:

$$B_{avg}(t) = \sum_{i=0}^{3} \binom{3}{i}(1-t)^{3-i}t^i P_{iavg}$$

$$= (1-t)^3 P_{0avg} + \binom{3}{1}(1-t)^2 t^1 P_{1avg} + \binom{3}{2}(1-t)^1 t^2 P_{2avg} + t^3 P_{3avg}$$

Where $t \in [0,1]$.

In the preferred embodiments, in the step 34200, the translocation from an arbitrary point on the individual Bezier tube $B_{ind}(t_m)$ to the same index point on the averaged Bezier tube $B_{avg}(t_m)$ is computed. The difference of these two points can be written as the weighting sum of the differences of the Bezier tube control points because these two points can be described by linear equations:

$$B_{avg}(t_m) - B_{ind}(t_m) = \sum_{i=0}^{3} \binom{3}{i} t_m^i (1-t_m)^{n-i} (P_{i,avg} - P_{i,ind})$$

Using the equation above, the matrix of the translocation that represents the movement of curve points may be generated.

Figure 4:
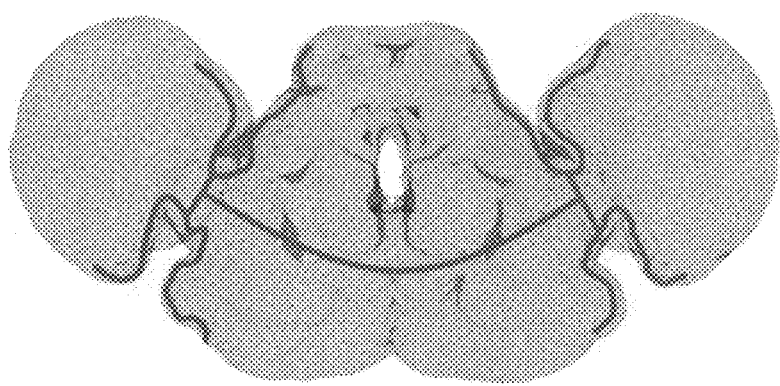
FIG. 4 illustrates an exemplary skeleton according to the embodiments of the present invention.
Figure 11:
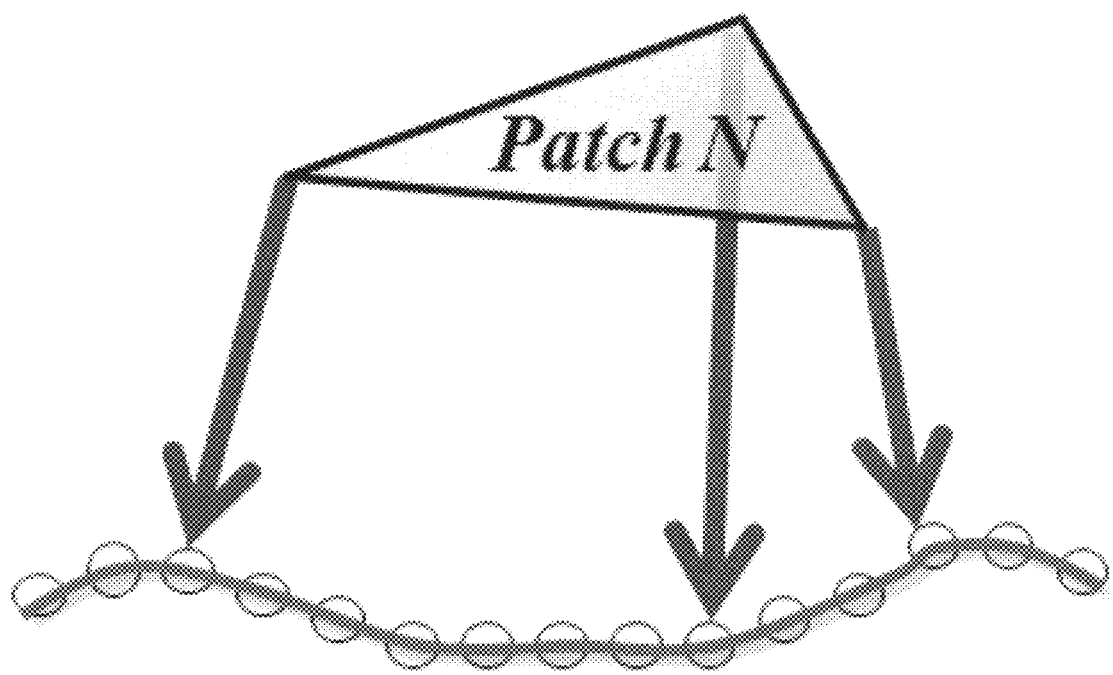
FIG. 11 illustrates the relationship between the patches of the image data and the Bezier tube according to the embodiments of the present invention.

In the preferred embodiments, in the step 34300, the averaged Bezier tube (averaged Bezier tube control points) is utilized as skeleton or skeleton-like, for controlling the deformation of the 1 to $N^{th}$ image data. FIG. 4 shows the skeleton or skeleton-like mentioned herein. In the following procedures, the skeleton is utilized to adjust the image data, for ensuring they have similar concave-shaped structure. In order to figure out the belonging skeleton point for each vertex on the surface model, the 3D Euclidian distance between each vertex and point on Bezier curves is measured. Since the Bezier curve plays a "skeleton-like" role, the correspondence between each vertex and Bezier curve will be higher if the measurement of Euclidian distance is less (and vice versa). Therefore, it just needs to take the nearest curve point as the correspondence point for any vertex point as shown in FIG. 11. FIG. 11 shows the correspondence of the vertex of patch n of the image data and the Bezier tube, for finding the weight of deformation. The deformation weighting tends to have the following characteristics:

1. The weighting may be less as the distance between a vertex and its correspondence point on the curve is longer;
2. If distance <R, the vertex shall follow the whole corresponding movement vector (100%), that is the weighting may be 1;
3. If distance >R+λ, the vertex shall ignore corresponding movement vector (0%), that is the weighting will be approximately 0.

R is the radius of Bezier tube, and λ is the distance of the decay. To be natural, deformation weighting requires a smooth nonlinear function, like the sigmoid function, which has an "s" shape and climbs up smoothly:

$$f(t) = \frac{1}{1+e^{-t}}$$

The scaled and transferred sigmoid function with α and β can be considered as a smooth weighting function. Using the sigmoid function, the new vertex position may be calculated as follows:

$$NewVertex(\text{Index}) = \text{Vertex}(\text{Index}) + \text{movement} \times \frac{1}{1+e^{\alpha(dist-\beta)}}$$

$$= \text{Vertex}(\text{Index}) + \text{moving}$$

Figure 12:
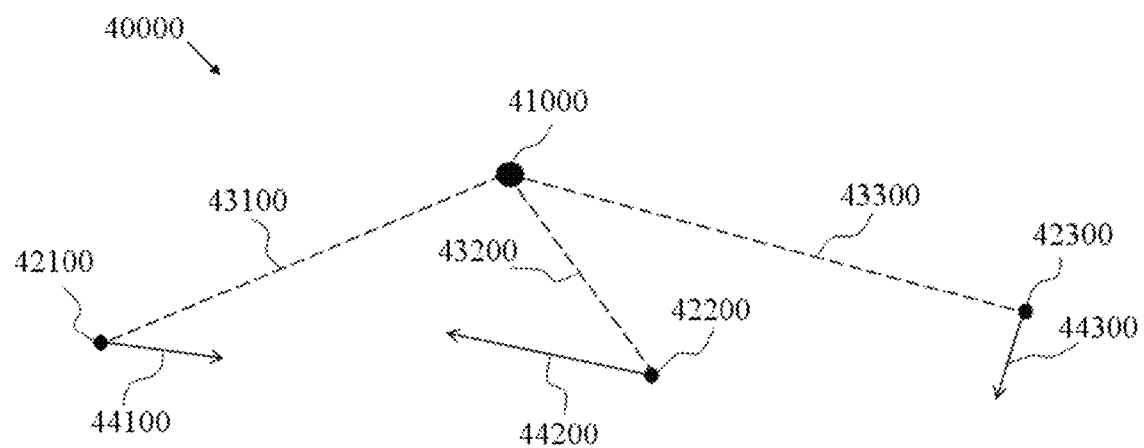
FIG. 12 illustrates the relationship between the vertex and the movement vector according to the embodiments of the present invention.

The movement is the correspondence point movement of any vertex. The multiple deformation field is the combination of the whole process mentioned above, with the vertex point on a shape model being controlled by multiple curves, as shown in FIG. 12, wherein the distance between the vertex 41000 and the correspondence points on each Bezier tube are 43100, 43200, and 43300, and the movement vectors are 44100, 44200, and 44300. Moreover, the deformation procedure may utilize the equation as follows:

$$NewVertexData =$$

$$vertexData + \frac{\sum_{i=1}^{n} \text{Movement}_i \times \frac{1}{1+e^{\alpha(Dist_i - \beta)}} \times \frac{1}{1+e^{\gamma(Dist_i - \eta)}}}{\sum_{i=1}^{n} \frac{1}{1+e^{\gamma(Dist_i - \eta)}}}$$

Where α, β, γ, and η are the sigmoid function scaling and transferred variables. Using the equation above, all vertices vertexData may be deformed to have averaged appearance (new vertices NewVertexData) using those movements Movement generated by Bezier curves.

In the preferred embodiments, in the step 35100, the averaging procedure may comprise signed distance map (SDM) averaging procedure which comprises:

1. Transform the shape model into the volume model and cut into slices;
2. Create SDM of slices;
3. Cumulatively sum up the SDM slice of each shape model and find the zero contour as averaged contour;
4. Stack up the zero contour and obtain the averaged 3D contour;
5. Transform 3D contour to shape model (wireframe).

Figure 13:
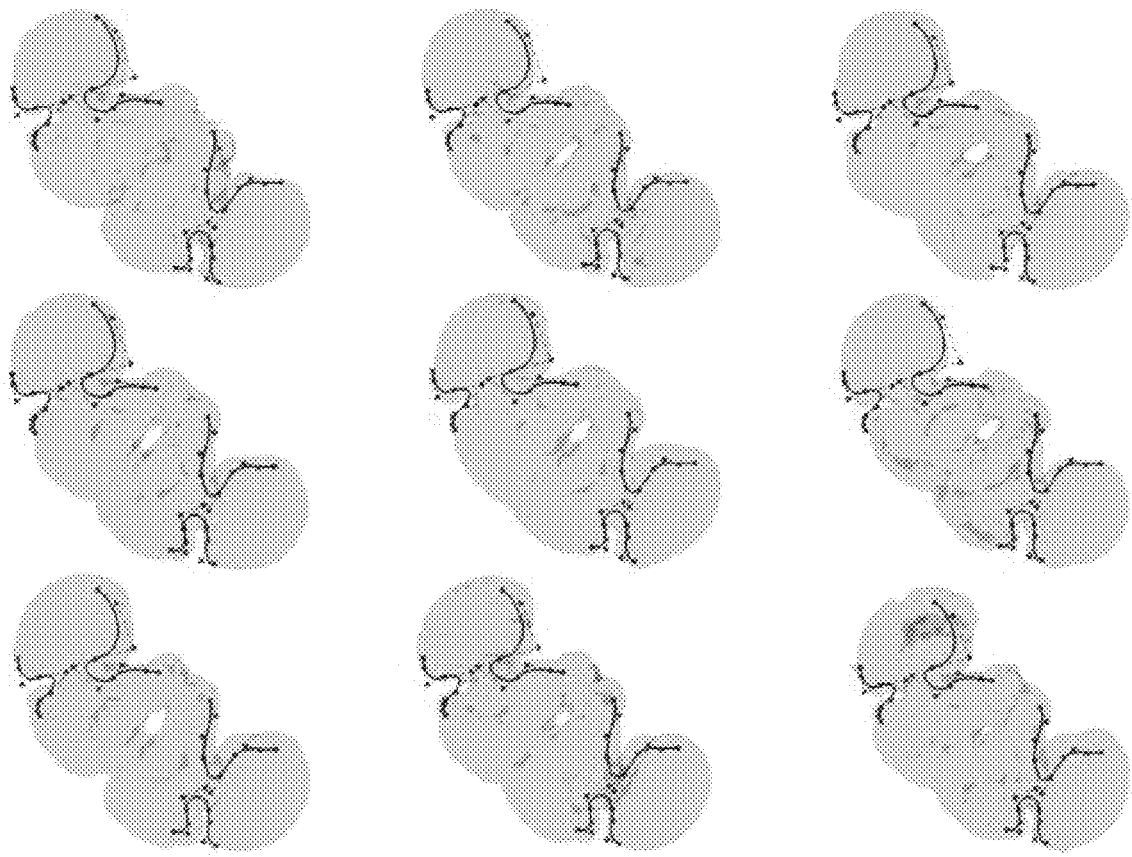
FIG. 13 illustrates the initial feature curve of nine brain model according to the embodiments of the present invention.

In the preferred embodiments, the initial feature curve of nine brain model are shown as FIG. 13 (Refer to step 33200, projecting the Bezier tube of the reference image data to those 1 to $N^{th}$ image data, as the initial position of the Bezier tubes).

Figure 14:
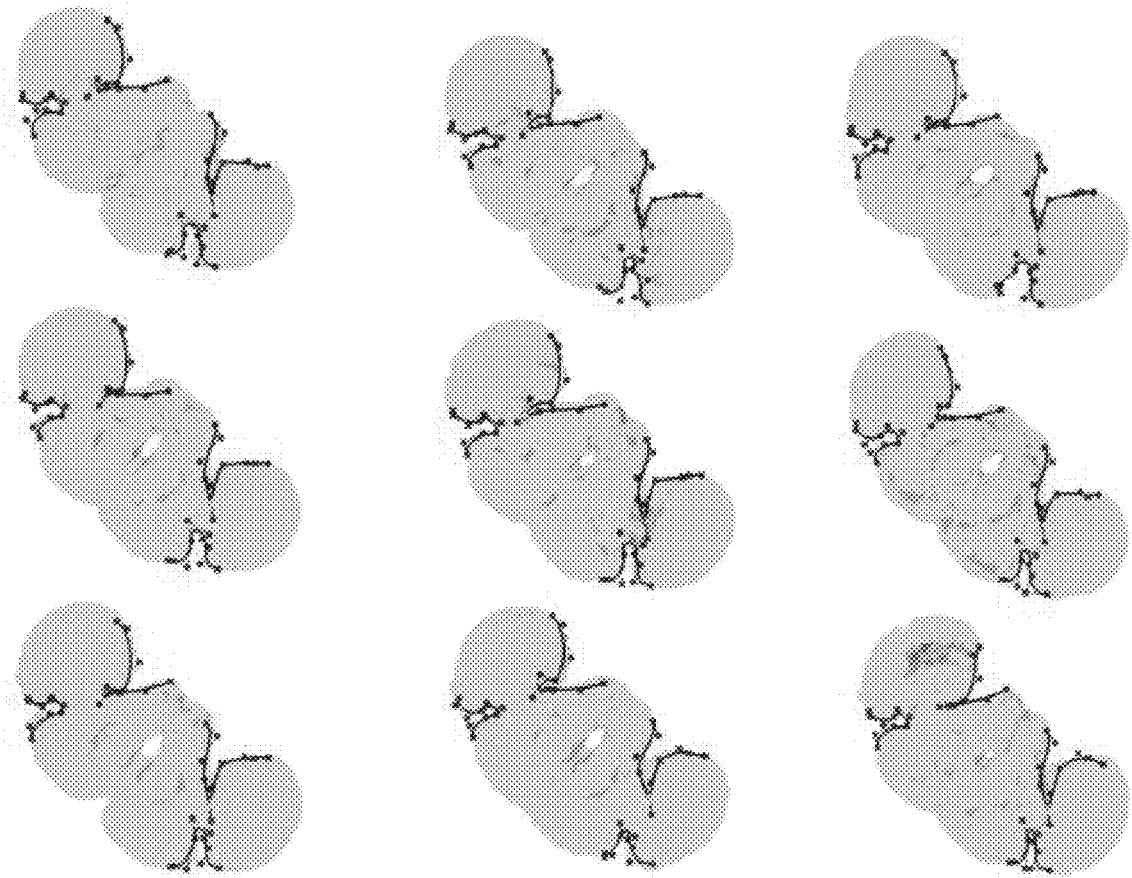
FIG. 14 illustrates the feature curve after feature capturing procedure according to the embodiments of the present invention.
Figure 15:
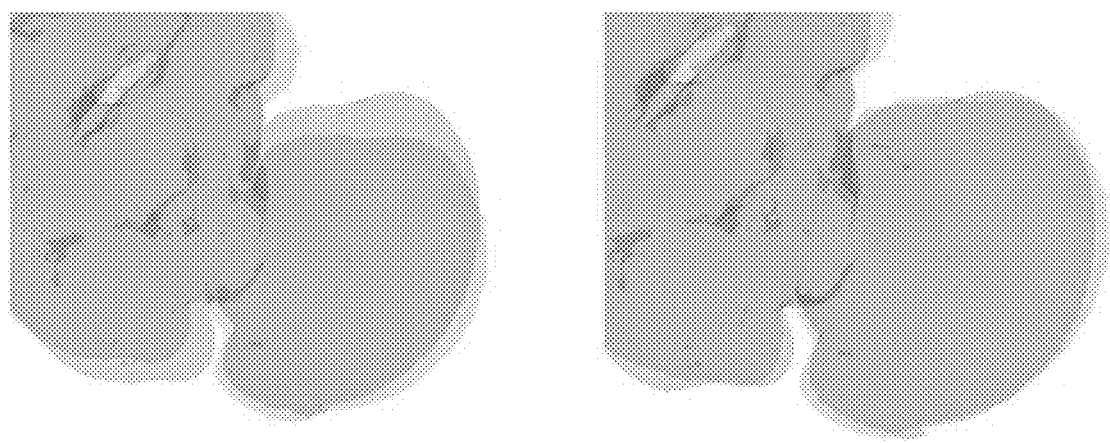
FIG. 15 illustrates the superimposition of the two image data before or after the deformation procedure according to the embodiments of the present invention.

The result generated after the process of step 33200 is shown in FIG. 14. In FIG. 14, it can be observed that the feature of each image data may be well captured after the Bezier tube fitting procedure. Moreover, FIG. 15 shows the superimposition of the two image data before or after the deformation procedure according to the embodiments of the present invention. It can be observed that the extent of the superimposition of the two image data is improved with the deformation procedure, for facilitating retaining important feature of the image data with (after) averaging procedure.

Figure 16A:
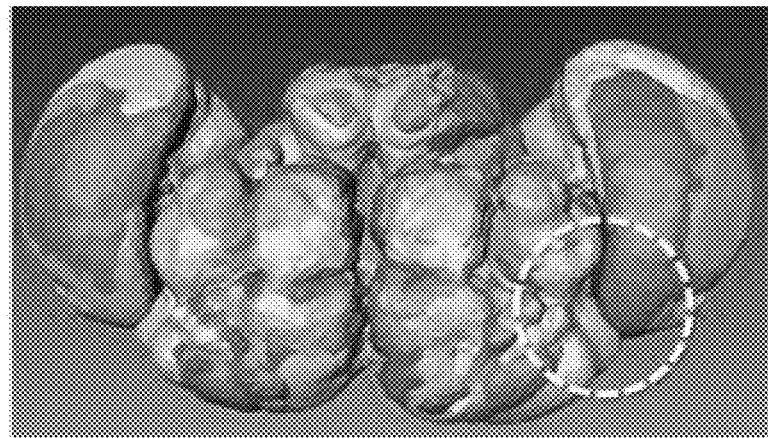
FIGS. 16A-16D illustrate several superimpositions of the image data before or after the deformation procedure according to the embodiments of the present invention.
Figure 16B:
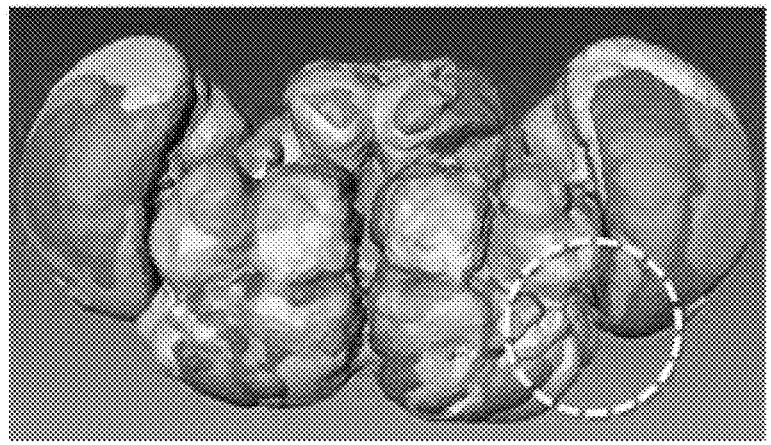
Figure 16C:
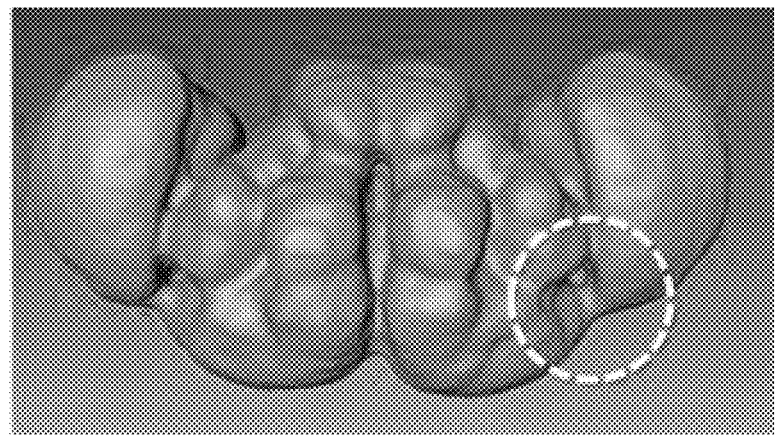
Figure 16D:
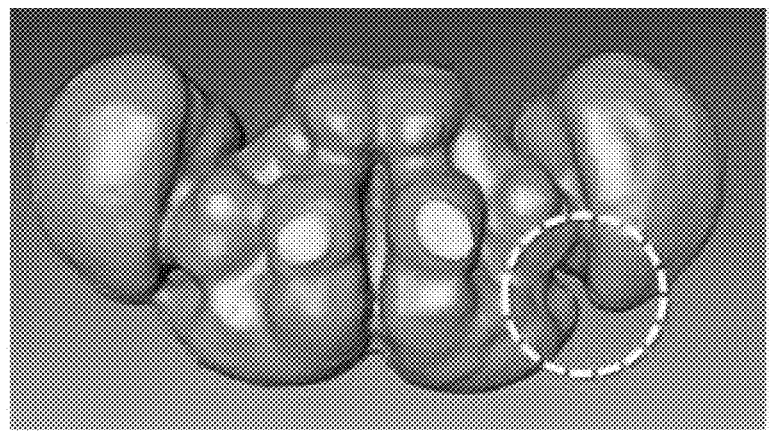

Furthermore, FIG. 16A shows the superimposition of three image data without deformation. FIG. 16B shows the superimposition of three image data with deformation. FIG. 16C shows the averaged image data without deformation. FIG. 16D shows the averaged image data with deformation. Open the circle marks signed in the FIGS. 16A to 16D, it can be observed that the features, such as the concave-shaped structures, are reasonably well retained with the process of the method according to the embodiments of the present invention. In contrast, most of the features are lost without the process of the method. The lost of the feature information makes the such formed standard brain model invalid.

The above descriptions are the preferred embodiments of the present invention. They are intended to explain the present invention but not limit the range of the present invention. The range of the present invention should base upon the claims and their equivalences. The variation and modification made by others without departing the range and the spirit of the present invention may be viewed as the equivalence of the present invention.

What is claimed is:

1. An image processing method for feature retention associated with averaging a plurality of image data, said image processing method comprising:
    scaling and aligning a plurality of image data for acquiring feature information;
    determining a plurality of two-dimensional feature label points according to said feature information for generating at least one Bezier curve;
    utilizing said at least one Bezier curve to generate at least one Bezier tube and performing Bezier tube fitting for generating result of Bezier tube fitting;
    deforming, by a processor, said plurality of image data according to said Bezier tube or said result of Bezier tube fitting for generating a plurality of deformed image data, wherein said deforming process comprises (a). averaging said at least one set Bezier tube control points across said plurality of image data for generating a plurality of averaged Bezier tube control points, (b). determining a transformation of individual Bezier tube control points of said plurality of image data relative to their corresponding averaged Bezier tube control points, for generating a transformation information of each of said plurality of image data, (c). deforming said plurality of image data according to said transformation information for each of said plurality of image data and a correspondence map of each of said plurality of image data, wherein said correspondence map of each of said plurality of image data is generated by disposing said averaged Bezier tube control points on one of said plurality of image data being scaled and aligned; and
    averaging said plurality of deformed image data for generating feature-retained averaged image data.

2. The image processing method according to claim 1, further comprising utilizing an image output interface to transmit said feature-retained averaged image data to a display or utilizing a wired or wireless network to transmit said feature-retained averaged image data to a remote computer.

3. The image processing method according to claim 1, wherein step of said determining a plurality of two-dimensional feature label points according to said feature information for generating at least one Bezier curve comprises:
    utilizing said plurality of two-dimensional feature label points to generate a plurality of three-dimensional feature label points; and
    utilizing least square procedure to generate said least one Bezier curve according to said plurality of three-dimensional feature label points.

4. The image processing method according to claim 3, wherein step of said utilizing said plurality of two-dimensional feature label points to generate a plurality of three-dimensional feature label points comprises:
    generating a plurality of vectors being vertical to two-dimensional observation plane according to said plurality of two-dimensional feature label points;
    sending said plurality of vectors to penetrate through said image data;
    finding a plurality of patch groups being penetrated by said plurality of vectors;
    finding middle positions of said plurality of patch groups to obtain a plurality of middle points; and
    setting said plurality of middle points as said plurality of three-dimensional feature label points.

5. The image processing method according to claim 3, wherein step of said utilizing least square procedure to generate said at least one Bezier curve square procedure to generate said at least one Bezier curve according to said plurality of three-dimensional feature label points comprises:
    dividing said plurality of three-dimensional feature label points into a plurality of three-dimensional feature label point groups;
    generating a plurality of Bezier curve segments according to said plurality of three-dimensional feature label point groups; and
    generating said at least one Bezier curve according to said plurality of Bezier curve segments.

6. The image processing method according to claim 5, wherein step of said generating a plurality of Bezier curve segments according to said plurality of three-dimensional feature label point groups comprises:
    utilizing a least square procedure to generate a least square cost function according to said plurality of three-dimensional feature label point groups;
    utilizing a first-order partial derivative procedure to said least square cost function to find middle Bezier curve control points of said plurality of three-dimensional feature label points; and
    generating said plurality of Bezier curve segments according to said plurality of three-dimensional feature label point groups and said middle Bezier curve control points.

7. The image processing method according to claim 1, wherein step of said deforming said plurality of image data according to said Bezier tube or said result of Bezier tube fitting for generating a plurality of deformed image data comprises finding deformation weights.

8. The image processing method according to claim 1, wherein said deforming said plurality of image data according to said Bezier tube or said result of Bezier tube fitting for generating a plurality of deformed image data comprises a non-linear function processing procedure.

9. The image processing method according to claim 1, wherein step of said averaging said plurality of deformed image data for generating a feature-retained average image data comprises a signed distance map averaging procedure.

10. The image processing method according to claim 1, wherein said plurality of image data are three-dimensional brain model image data.

11. The image processing method according to claim 1, wherein said feature information is concave-shaped structure information of brain model image.

12. A computer system, comprising:
    a processing unit; and
    a storage device interface coupled to the processing unit, and said storage device interface coupled to an image processing system for feature retention associated with averaging a plurality of image data, said image processing system comprising:
    a control module;

a scaling and aligning module coupled to said control module, for scaling and aligning the plurality of image data for acquiring feature information;

a Bezier curve fitting module coupled to said control module, for determining a plurality of two-dimensional feature label points according to said feature information for generating at least one Bezier curve;

a Bezier tube fitting module coupled to said control module, for utilizing said at least one Bezier curve to generate at least one Bezier tube and performing Bezier tube fitting for generating result of Bezier tube fitting;

a deforming module coupled to said control module, for deforming said plurality of image data according to said Bezier tube or said result of Bezier tube fitting for generating a plurality of deformed image data, wherein said deforming process comprises (a). averaging said at least one set Bezier tube control points across said plurality of image data for generating a plurality of averaged Bezier tube control points, (b). determining a transformation of individual Bezier tube control points of said plurality of image data relative to their corresponding averaged Bezier tube control points, for generating a transformation information of each of said plurality of image data, (c). deforming said plurality of image data according to said transformation information for each of said plurality of image data and a correspondence map of each of said plurality of image data, wherein said correspondence map of each of said plurality of image data is generated by disposing said averaged Bezier tube control points on one of said plurality of image data being scaled and aligned;

an averaging module coupled to said control module, for averaging said plurality of deformed image data for generating feature-retained averaged image data; and a database module coupled to said control module, for storing data and/or information generated by each of said modules.

13. The computer system according to claim 12, wherein said plurality of image data are three-dimensional *Drosophila* brain model image data.

14. The computer system according to claim 12, wherein said feature information is concave-shaped structure information of brain model image.

15. A non-transitory computer readable storage medium, said storage medium storing a program of instructions executable by a computer to perform an image processing method for feature retention associated with averaging a plurality of image data, said storage medium comprising instructions to:

scale and align a plurality of image data for acquiring feature information;

determine a plurality of two-dimensional feature label points according to said feature information for generating at least one Bezier curve;

utilize said at least one Bezier curve to generate at least one Bezier tube and perform Bezier tube fitting for generating result of Bezier tube fitting;

deform said plurality of image data according to said Bezier tube or said result of Bezier tube fitting for generating a plurality of deformed image data, wherein said deforming process comprises (a). averaging said at least one set Bezier tube control points across said plurality of image data for generating a plurality of averaged Bezier tube control points, (b). determining a transformation of individual Bezier tube control points of said plurality of image data relative to their corresponding averaged Bezier tube control points, for generating a transformation information of each of said plurality of image data, (c). deforming said plurality of image data according to said transformation information for each of said plurality of image data and a correspondence map of each of said plurality of image data, wherein said correspondence map of each of said plurality of image data is generated by disposing said averaged Bezier tube control points on one of said plurality of image data being scaled and aligned; and average said plurality of deformed image data for generating feature-retained averaged image data.

* * * * *